No. 690,187. Patented Dec. 31, 1901.
J. L. ROBISON.
WRENCH.
(Application filed Nov. 28, 1900.)
(No Model.)
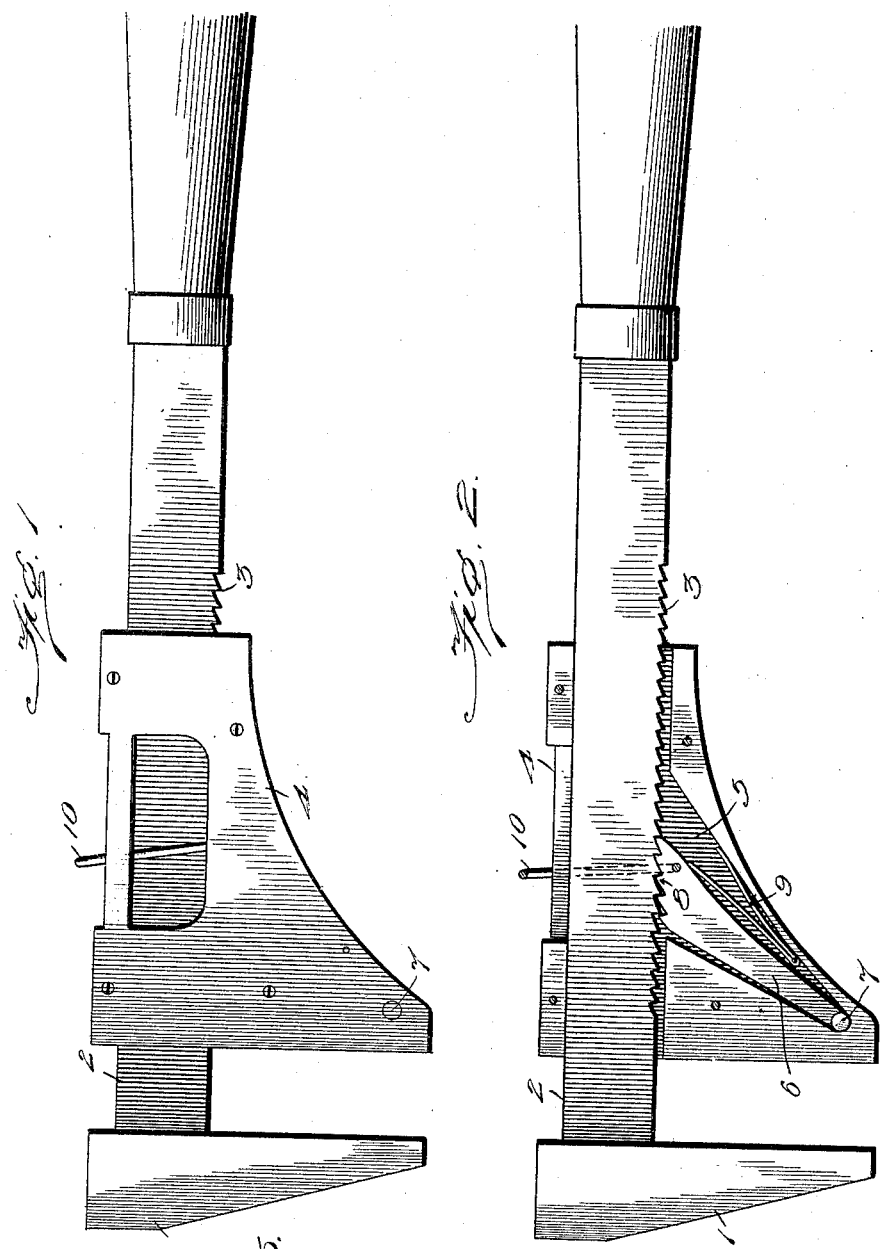

UNITED STATES PATENT OFFICE.

JESSE L. ROBISON, OF CROSSFORK, PENNSYLVANIA.

WRENCH.

SPECIFICATION forming part of Letters Patent No. 690,187, dated December 31, 1901.

Application filed November 28, 1900. Serial No. 38,041. (No model.)

*To all whom it may concern:*

Be it known that I, JESSE L. ROBISON, a citizen of the United States, residing at Crossfork, in the county of Potter and State of Pennsylvania, have invented new and useful Improvements in Wrenches, of which the following is a specification.

This invention relates to new and useful improvements in wrenches; and its primary object is to provide a device having a sliding jaw which is adapted to be locked at any desired point upon the shank of the fixed jaw.

A further object is to provide means whereby said jaw may be quickly unlocked from the shank when desired.

With these and other objects in view the invention consists in providing a fixed jaw, upon the shank of which are arranged transversely-extending teeth or serrations. A jaw is slidably mounted upon this shank, and pivoted therein is a dog having a toothed face adapted to engage the teeth upon the shank. This dog is held normally in engagement with said teeth by means of a spring seated within the sliding jaw. A yoke is pivoted to the dog and extends around the shank and is adapted when pressed toward said shank to throw the dog out of engagement with the teeth of the shank, and thereby permit the sliding jaw to be moved.

The invention also consists in certain novel features of construction and combination of parts, which will be hereinafter fully described and claimed, and illustrated in the accompanying drawings, showing the preferred form of my invention, and in which—

Figure 1 is a side elevation of the wrench. Fig. 2 is a longitudinal section. Fig. 3 is a detail view of the dog and its yoke.

Referring to the figures of the drawings by numerals of reference, 1 is a fixed jaw, from which extends a shank 2, having teeth 3, arranged upon the inner edge thereof.

A sliding jaw 4 is mounted upon the shank 2 and is preferably formed of two similar castings, each of which is recessed longitudinally for the reception of one-half of the shank and is provided in rear of its working face with a recess 5 for the reception of a dog 6. When two castings are brought together, the recesses 5 form a chamber having inclined walls $5^a$ and $5^b$ sufficiently separated to permit the required movement of the dog 6. This dog is preferably of the form shown in Fig. 2 and is provided at its upper end with trunnions 7, which are pivoted in the two sections of the casting. The lower face of the dog is beveled, so as to lie normally parallel with the toothed face of the shank, and this face of the dog is provided with transversely-extending teeth 8, which are held normally in engagement with the teeth of the shank by means of a bow-spring 9, which bears at opposite ends upon the walls of the recess 5 and the rear face of the dog 6. In lieu of the trunnions 7 a rivet or bolt may be inserted through the sections of the sliding jaw and through an aperture (not shown) formed within the end of the dog.

A yoke 10 incloses the shank 2, and the ends thereof are turned inward and pivoted within the dog 6 at a point adjacent to the toothed face thereof. The two sections of the jaw are secured together in any suitable manner, as by means of rivets or bolts.

When it is desired to adjust the sliding jaw toward the fixed jaw, it is merely necessary to move the same along the shank. The teeth upon said shank will force the dog upward out of engagement therewith, and the same will be free to slip thereover. When, however, backward pressure is exerted upon the sliding jaw, the dog therein will engage the teeth upon the shank and prevent backward movement.

When it is desired to slide the jaw 4 from the fixed jaw, the yoke 10 is pressed toward the shank. This will cause the dog to swing upward upon its pivot, and the sliding jaw can then be readily removed.

It will be seen that the pivot of the dog is located at a point above and in front of the point of contact between the dog and shank, and therefore any backward pressure upon the sliding jaw will tend to throw the dog more firmly into engagement with the shank.

In the foregoing description I have embodied the preferred form of my invention; but I do not wish to be understood as limiting myself thereto, as I am aware that modifications may be made therein without departing from the principle or sacrificing any of the advantages of this invention, and I therefore reserve to myself the right to make such changes as fairly fall within the scope thereof.

Having thus described the invention, what is claimed, and desired to be secured by Letters Patent, is—

A wrench comprising a toothed shank, a fixed jaw on said shank, a sliding jaw consisting of two sections recessed on their inner sides and adapted when brought together to form a chamber having inclined walls and also formed with registering bearings, a dog provided at one end with trunnions fitting in said bearings, the opposite end being beveled permitting it to lie normally parallel with the toothed face of the shank, and being toothed to engage the teeth upon the shank, a bow-spring situated within said recess one end bearing upon a wall of the recess and the other on the rear face of the dog, holding said dog in engagement with the shank, and a yoke for disengaging the dog, consisting of a bail spanning the shank and having its sides extending down between the outer sides of the shank and the inner sides of the sliding-jaw sections, and its ends bent inward to enter openings in the dog.

In testimony whereof I affix my signature in presence of two witnesses.

JESSE L. ROBISON.

Witnesses:
E. PELTZ,
S. G. MEARS.